United States Patent [19]
Neri

[11] 3,934,308
[45] Jan. 27, 1976

[54] HAMBURGER PATTY PRESS

[76] Inventor: Joseph R. Neri, 3101 Quentin Road, Brooklyn, N.Y. 11234

[22] Filed: Aug. 26, 1974

[21] Appl. No.: 500,311

[52] U.S. Cl. .................................... 17/32; 425/410
[51] Int. Cl.² ............................................ A22C 7/00
[58] Field of Search ......................... 425/410; 17/32

[56] References Cited
UNITED STATES PATENTS
3,261,897   7/1966   Monk .................................. 425/410
3,332,106   7/1967   Zoehfeld .................................. 17/32

Primary Examiner—Robert Peshock
Attorney, Agent, or Firm—Clement J. Vicari

[57] ABSTRACT

A molding device for producing compressed material such as meat patties and the like. The device is capable of forming meat patties of uniform size and shape and provides for easy removal of the formed meat patty.

10 Claims, 4 Drawing Figures

U.S. Patent   Jan. 27, 1976   Sheet 1 of 2   3,934,308
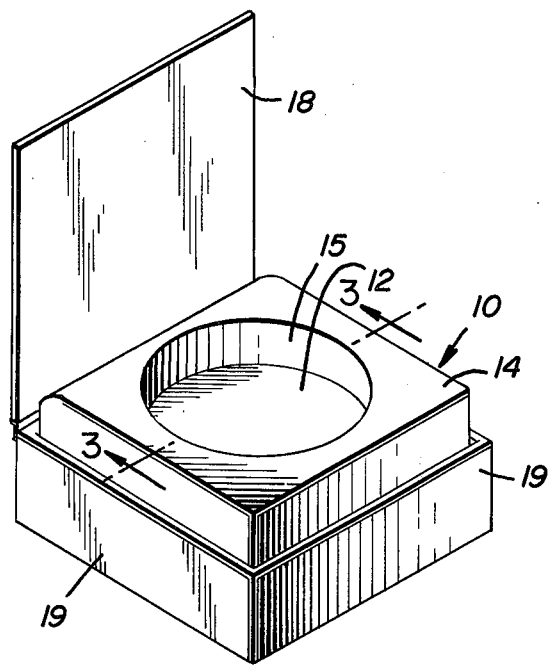
FIG. 1
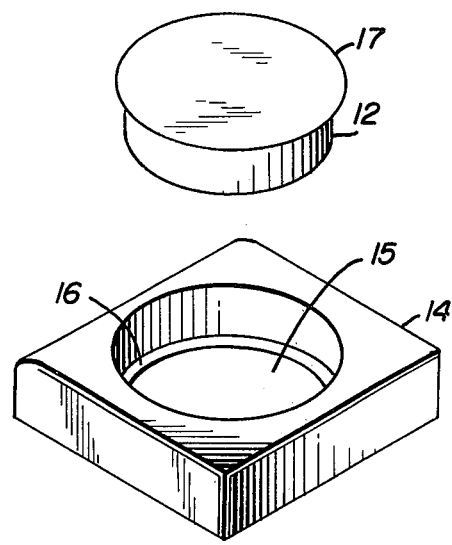
FIG. 2
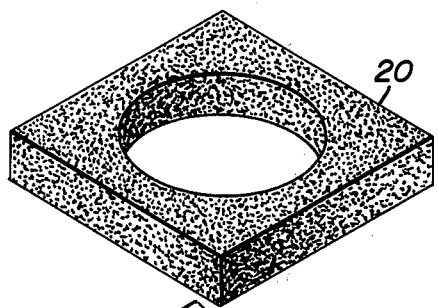
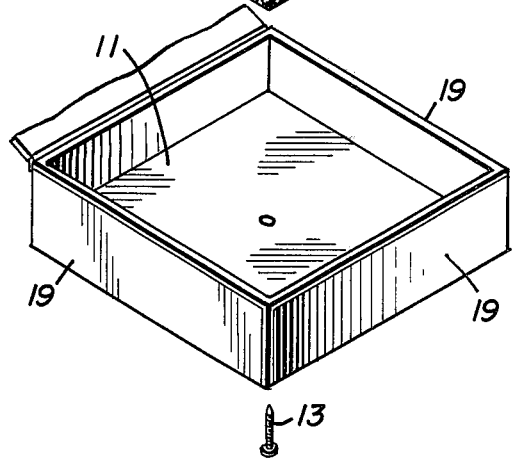

HAMBURGER PATTY PRESS

The present invention relates to a molding device which is designed primarily for compressing and molding chopped or ground meat into "patties." In a more specific aspect, the present invention relates to a hamburger patty mold device which is suitable for fabricating packaged hamburger patties.

Previously there have been many machines of various types which have been utilized to form ground meat patties, but all such mechanisms have been either too large, cumbersome and expensive. Moreover, some such machines are difficult to clean and removal of the formed patty is awkward and difficult. For example in some molding devices, after the patty is formed, it is necessary to remove the formed patty with a knife or spatula and the like. This of course is time consuming and in some instances can be dangerous. Moreover, in most instances, prior art machines of the type contemplated herein, have been designed for restaurant or other volume use. The present invention, on the other hand, is designed primarily for home use, and is not intended to be used to produce meat patties in large volume.

Accordingly, one of the principal objects of this invention is to provide an inexpensive device which will provide a means of forming meat patties of uniform size and shape. Patties thus formed may be stored in any of the various types of refrigeration units or by other food storage methods in preparation for subsequent immediate use.

Another object of this invention is to provide meat patties, the contents of which can be made of uniform quantity to afford assurance that all persons who are to share the meal will receive appropriate portions. By this means it is thus possible to obtain meat patties of sizes appropriate to satisfy the appetites of all of the members of the family, and at the same time provide uniform fair proportionment of a quantity of meat into appropriate sizes. For example, with a family of four children, a housewife may provide the two larger children with identical large size patties and the two small children with identical small size patties and thus avoid intra-family disputes over the portions served.

Still another object of the present invention is to form a packaged meat patty which is easily removed from the forming machine.

Other and further important objects of the invention will be apparent from the following description of the invention taken in conjunction with the accompanying drawings in which:

FIG. 1 is a perspective view of a press constructed in accordance with my invention.

FIG. 2 is a perspective view in exploded form showing the relative placement of the elements constituting the invention.

Figure 3:
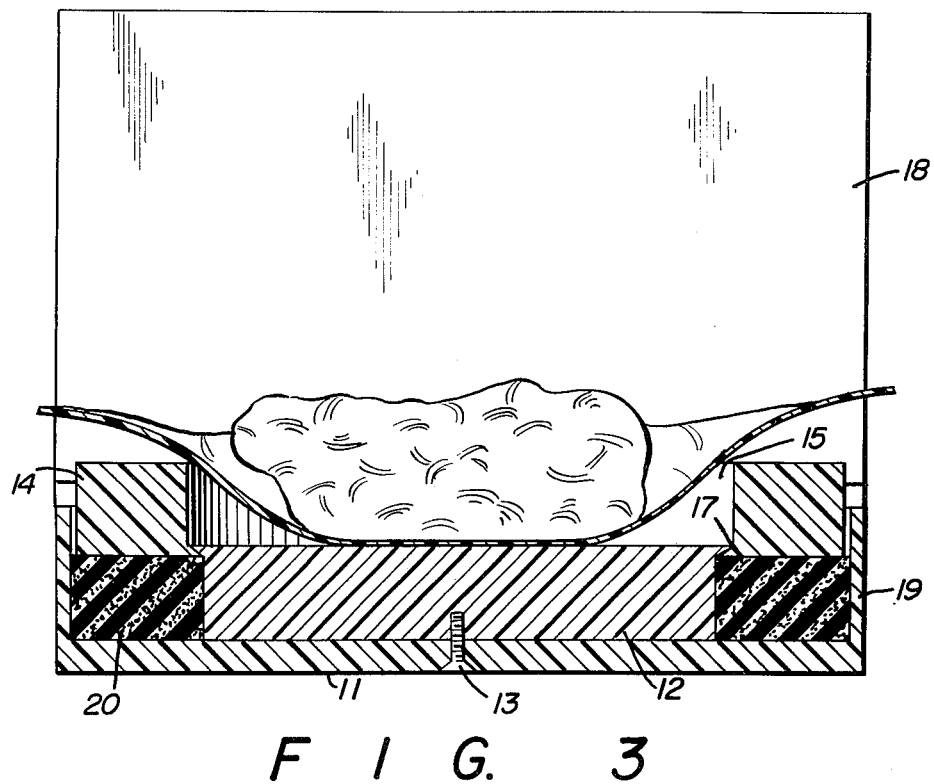
FIG. 3 is a section taken through line 3—3 of FIG. 1 showing the ground meat in the mold cavity prior to formation of the meat patty.

Broadly contemplated, the present invention provides a molding device for producing compressed material such as meat patties and the like which comprises in combination: a stationary horizontal base plate, a mold having a through opening providing a molding cavity adapted to accommodate material to be molded, said mold being movably mounted with respect to said base plate, resilient means associated with said base plate and mold for urging said mold away from said base plate when said mold is pressed towards said base plate, a core element detachably secured to said base plate and being disposed in registering relation with said molding cavity, said mold being relatively movable between a first position in which said core element is disposed in the lower portion of said molding cavity and a second position in which said core element is disposed upward from said first position, retaining means associated with said core element and said mold for retaining said mold and core element in said first position when said mold device is in non-operating condition and pressing means associated with said mold for compressing said material in said cavity against said core element and for moving said mold from said first position to said second position.

Referring to the drawings and particularly FIGS. 1 and 2, it will be seen that the molding device, generally indicated by reference numeral 10, includes a stationary, horizontal base plate 11 which can be constructed from any desired material providing the necessary rigidity and strength. Merely as illustrative, the base plate can be constructed from materials such as hard wood, metal, e.g. stainless steel, or preferably one of the well known plastics, such as polyethylene, polypropylene, nylon, teflon or the like which are inert and readily molded or cast to shape and which provide hard, smooth and easily cleanable surfaces ideal for use in the processing of foods. The base plate 11 is flat and disposed in a single plane.

Detachably secured to base plate 11 is a core element 12, desirably cylindrical in shape and having an upper and lower surface and which is secured to the base plate by means of threaded element 13 (FIG. 4) which threadably engages the core element 12 through an oepning provided in the base plate.

The core element, which can be made of the same type of material as the base plate is provided with an annular outwardly projecting flange or abutment 17 formed on the upper surface of the core element and which constitutes the outer periphery of the upper surface of the core element.

Situated directly above the base plate 11 in spaced relation therewith is a mold 14 which can be formed of any desired material such as wood, metal, plastic and the like. The mold has a through opening 15 which provides a molding cavity adapted to accommodate material to be molded or shaped.

Referring specifically to FIG. 2, it will be seen that the mold 14 is positioned over the base plate 11 in a manner such that the fixed core element 12 constitutes the bottom of the mold cavity. Since the outer edges of the mold cavity are concentrically disposed with respect to the outer periphery of the core element, the mold can be vertically moved with respect to the core element so that the core element is in registering relation with the molding cavity.

Situated on the lower surface of the mold 14 is an annular projecting flange or abutment 16 which projects inwardly towards the inner axis of the mold cavity. Since the core element is secured to the base plate 10, it will be seen that the inwardly projecting flange 16 on mold 14 and the outwardly projecting flange 17 of the core element 12 act as retainer means for limiting the upward movement of the mold away from the base plate 11. It will be, of course, understood that other arrangements for limiting the upward movement of the mold are possible. For example, the flanges need not be contiguous, i.e., disposed around the entire periphery of each respective element.

Situated between the lower surface of the mold 14 and the upper surface of the base plate 11 are resilient means which function in a manner such that when the device is in normal or non-operating condition, the mold is maintained in its uppermost position, i.e., the outwardly projecting flange 17 of the core element 12 is in contact with the inwardly projecting flange 16 of the mold. Since the core element 12 is secured to the base plate 11, the mold is only capable of vertical movement as determined by the vertical distance between the flange 17 and the base plate 11. The resilient means shown in FIGS. 2, 3, and 4 constitute a normally compressible resilient material such as polyurethane foam 20. Although it is not essential, nevertheless the foam 20 is generally co-extensive with the base plate and is provided with an opening at its center to accommodate the core element 12.

The height of the foam, i.e., the vertical distance of the foam, is such that when the foam is in an uncompressed state the mold 14 resting thereon will be in a first position in which the core element 12 is disposed in the lower portion of the molding cavity (as shown in FIG. 1) with the flange 16 of the mold in contact with flange 17 of the core element.

Figure 4:
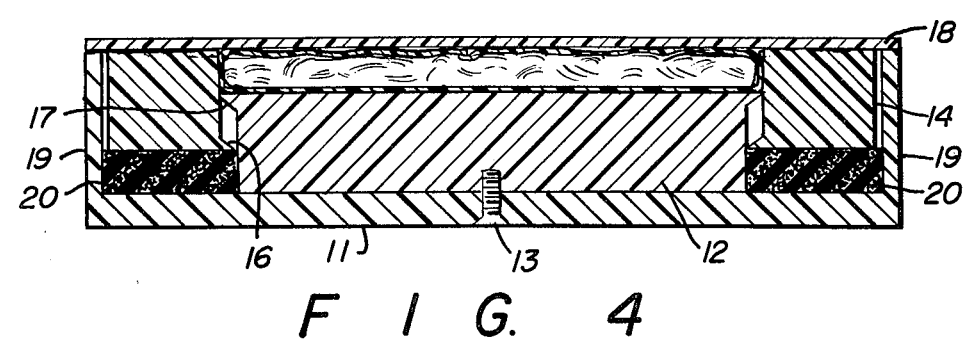
FIG. 4 is a view similar to FIG. 3 except that the ground meat is in a compressed state with the cover plate pressed against the mold.

On the other hand, when sufficient downward pressure is applied to the mold, the foam will compress and permit the mold 14 to be urged towards the base plate 11 to a second position in which the core element 12 is disposed upward from the first position (FIG. 4).

Provision for the application of force on the mold is made by the utilization of pressing means disposed over the mold. Thus referring again to the drawings, it will be seen that the pressing means are in the form of a cover plate 18 which can be of the same general construction as the base plate. Thus, the cover plate can be fabricated from the same type of materials utilized to form the base plate. As will be seen from the drawings, the cover plate is also flat and is pivotably mounted with respect to the mold 14. One end of the cover plate can be pivotably mounted to an end of the mold in a manner such that it can be pivoted away from the mold thereby exposing the through opening or mold cavity 15. Alternatively, the cover plate can be pivoted towards the mold 14 in contact with the mold, whereby pressure exerted on the cover plate would force the mold downwardly towards the base plate 11. Thus, the combination of the core element 12, the mold cavity 15 and the cover plate 18 forms the molding chamber wherein the meat patties are shaped in conforming relation to the shape of the molding chamber.

Although the device is operable as described in the foregoing, advantageously the elements can be contained on the base plate 11 and surrounded by upright walls 19 extending upward from the base plate 11 so as to form a rectangular or square type container for the elements. The upright walls can be of the same type materials as the base plate 11 and can be joined to the base plate subsequent to the formation of the base plate. Alternatively, the side walls and base plate can be initially formed as a single unit in the same molding operation.

In the case where the device is utilized in conjunction with the upright walls 19, the cover plate can be pivotably mounted on the upper edge of one of the side walls, as shown in FIG. 1. In this case, however, a slight modification of the structure is required in that the upright wall accommodating the cover plate in pivotal relation to the mold would by necessity be of shorter vertical dimension than the remaining upright walls so to allow for the proper, uniform "pressing action" on the mold during formation of a meat patty. In addition, the upper surface of the mold 14 nearest the upright wall containing the pivotably mounted cover plate would be rounded or sloped towards the outer edge as shown in FIGS. 1 and 2, so as to allow for the proper clearance of the cover plate when it is pivoted towards or away from the upper surface of the mold 14.

To operate the device, the parts are disposed in their respective positions as shown in FIG. 1 with the cover plate 18 pivoted away from the mold 14 exposing the through opening or molding cavity 15. The mold is in its uppermost or first position so that the flanges 16 and 17 are in contact.

In the case where the meat patty is to be packaged, the sheet of packaging material is placed in the mold cavity as shown in FIG. 3, with its outer edges extending beyond the edges of the molding device. The mold cavity is then supplied with the material of which the patties are to be made, e.g. ground meat for the production of hamburger patties. The amount of meat can be predetermined so as to provide uniform size patties of equal weight. Thus in this manner, meat patties of sizes appropriate to satisfy the appetites of all of the members of the family can be produced. The operator thereafter folds the edges of the sheet material over the ground meat until all the meat is fully covered. The cover plate 18 is then pressed against the mold 14 and this action urges the mold towards the base plate 11 until the mold is in its second position as shown in FIG. 4. Since the core element 12 is secured to the base plate, it registers with the mold cavity and the meat patty is formed with dimensions defined by the cover plate, the core element and the walls of the mold cavity. The operator thereafter releases the pressure on the cover plate and swings it out of contact with the mold. In order to release the packaged hamburger patty, the operator merely depresses the mold cavity and grasps the hamburger patty to remove it from the mold cavity.

In another mode of operation, the above technique is repeated except that the device may be inverted against a flat surface and the lower surface of the back plate is pushed in a downward direction so that the cover plate pushes upward towards the core element thereby forming a meat patty when the device is in an "upside-down" position. The patty can then be removed by lifting the device and pivoting the cover plate away from the mold and with the hands depressing the mold towards the base plate allowing the patty to fall out of the mold cavity.

The device can be easily disassembled in order to clean all the elements, and all that is necessary is that the operator remove the threaded element 13 from the core element 12. The core element can then be easily removed from the mold 14 together with the mold, and the release means where they can be individually cleaned. After cleaning, the device is reassembled by first positioning the release means on the base plate and placing the mold over the release means. The core element is thereafter inserted into the through opening 15 of the mold 14 and the threaded element 13 inserted into the core element 12 in threadable engagement therewith.

It is to be understood that minor alterations in form, proportions and details, and additions and subtractions, may be made in the embodiments selected to illustrate the invention without departing from the spirit thereof or the scope of the appended claims.

What is claimed is:

1. A molding device which comprises in combination: a stationary horizontal base plate, a mold having a through opening providing a molding cavity adapted to accommodate material to be molded, said mold being movably mounted with respect to said base plate, resilient means associated with said base plate and mold for urging said mold away from said base plate when said mold is pressed towards said base plate, a core element detachably secured to said base plate and being disposed in registering relation with said molding cavity, said mold being relatively movable between a first position in which said core element is disposed in the lower portion of said molding cavity and a second position in which said core element is disposed upward from said first position, retaining means associated with said core element and said mold for retaining said mold and core element in said first position when said mold device is in non-operating condition and pressing means associated with said mold for compressing said material in said cavity against said core element and for moving said mold from said first position to said second position.

2. A molding device according to claim 1 wherein said resilient means include a layer of compressible resilient material disposed between said base plate and said mold.

3. A molding device according to claim 2 wherein said compressible resilient material is polyurethane foam.

4. A molding device according to claim 1 wherein said retaining means include an annular projecting flange disposed on the lower surface of said mold and an outwardly projecting flange disposed on the upper surface of said core element.

5. A molding device according to claim 4 wherein said annular projecting flange and said outwardly projecting flange are in a contacting relation when said mold is in said first position.

6. A molding device according to claim 4 wherein said annular projecting flange and said outwardly projecting flange are in an out-of-contact relation when said mold is in said second position.

7. A molding device for compressing and molding ground meat which comprises in combination: a stationary horizontal base plate, a mold having a through opening providing a molding cavity adapted to accommodate material to be molded, said mold being movably mounted with respect to said base plate, a layer of compressible resilient material disposed between said base plate and said mold for urging said mold away from said base plate when said mold is pressed towards said base plate, a core element detachably secured to said base plate and being disposed in registering relation with said molding cavity, said mold being relatively movable between a first position in which said core element is disposed in the lower portion of said molding cavity and a second position in which said core element is disposed upward from said first position, an annular projecting flange disposed on the lower surface of said mold and an outwardly projecting flange disposed on the upper surface of said core element, each of said flanges being adapted to retain said mold and core element in said first position when said mold device is in non-operating condition and pressing means associated with said mold for compressing said material in said cavity against said core element and for moving said mold from said first position to said second position.

8. A molding device according to claim 7 wherein said pressing means include a cover plate pivotally mounted with respect to said mold.

9. A molding device according to claim 7 including upright walls extending upward from said base plate and being adapted in combination with said base plate to form a container for said core element, said compressible resilient material and said mold.

10. A molding device according to claim 9 wherein said pressing means include a cover plate pivotally mounted on one of said upright walls.

* * * * *